Figure 1:
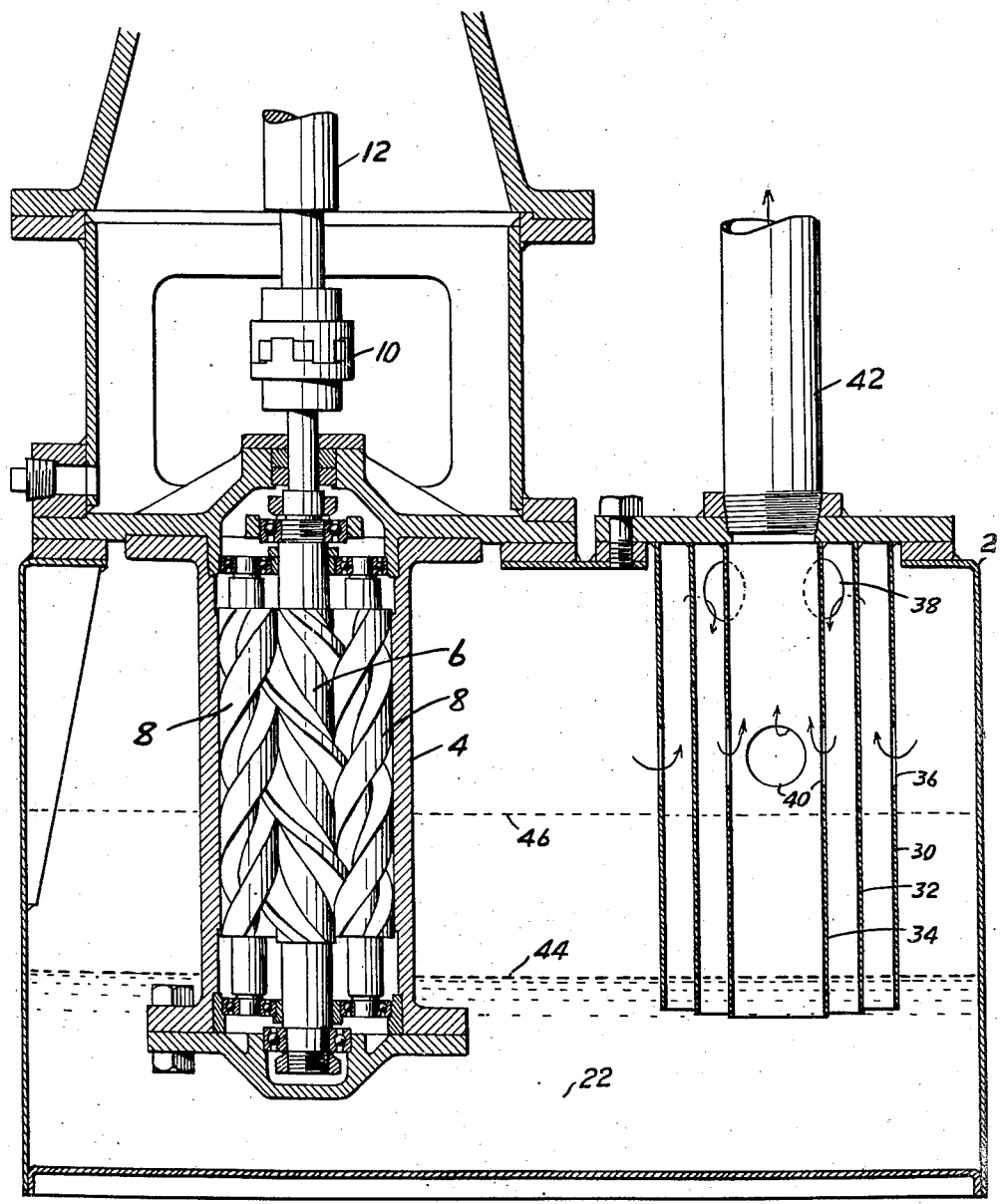

Oct. 24, 1944.   C. O. J. MONTELIUS   2,361,146
PUMP
Filed Sept. 21, 1939   2 Sheets-Sheet 1

WITNESS:

INVENTOR
Carl Oscar Josef Montelius
BY
ATTORNEYS.

Patented Oct. 24, 1944

2,361,146

UNITED STATES PATENT OFFICE 2,361,146

PUMP

Carl Oscar Josef Montelius, Stockholm, Sweden

Application September 21, 1939, Serial No. 295,869

3 Claims. (Cl. 230—205)

This invention relates to a pump for elastic fluids designed either to produce a vacuum or deliver gas under pressure.

Following the disclosures of various patents of C. O. J. Montelius, and particularly patents, 1,698,802; 1,821,523 and 1,965,557, it is possible to provide a screw pump comprising a plurality of screws which, during operation, provide theoretically completely bounded chambers travelling endwise of the screws and adapted to transfer fluid axially thereof. When such a pump operates to handle a liquid, a positive action results with the possibility of securing very high pressures at the discharge. Since these pumps may operate at very high speeds, their size for a large volumetric delivery against high head is very small as compared with pumps of prior types. From the fact that such a pump involves the travelling closed chambers mentioned above, there is immediately suggested the possibility of its use for handling elastic fluids, either to act as a vacuum pump or to act as a compressor. The handling of elastic fluids, however, gives rise to certain problems, particularly due to the fact that in order to have freely running screws it is necessary that minute, but nevertheless appreciable, clearances must be provided between them, particularly inasmuch as from the nature of the screws it is quite impossible to provide packing of practical nature along their lines of contact, at which, as will be evident from the above mentioned patents, a rubbing action must occur.

Since even very slight clearances will materially affect the efficacy of the pump as a producer of high vacuum or high pressure, sealing of the screw contacts must be provided for. It has been found that this sealing may be accomplished by the use of a lubricant having a proper viscosity.

At high velocities of operation, however, the centrifugal and other mechanical actions of the screws will cause a lubricant to be discharged along with the elastic fluid being handled in the form of a fine spray, and at the practical high speeds of operation which are desirably used, this spray, if permitted to be lost, would represent the consumption of a prohibitive amount of lubricant.

To minimize the formation of spray and also to prevent the pumping of too great an amount of lubricant with a consequent dissipation of energy as heat, it has been found necessary to carefully control the supply of lubricant to the screws and specifically in such fashion as to maintain the rate of supply substantially constant.

It is the object of the present invention to provide means for securing proper operation of a vacuum pump or compressor of the screw type just indicated by proper control of the supply of sealing lubricant. The invention, as will be apparent hereafter, is not only applicable to the type of screw pump described in said Montelius patents, but is also applicable to other screw types of pumps such as, for example, that described in the patent to Moineau 1,892,217, to provide effective action of the latter type of screw pumps as vacuum pumps or compressors.

Figure 2:
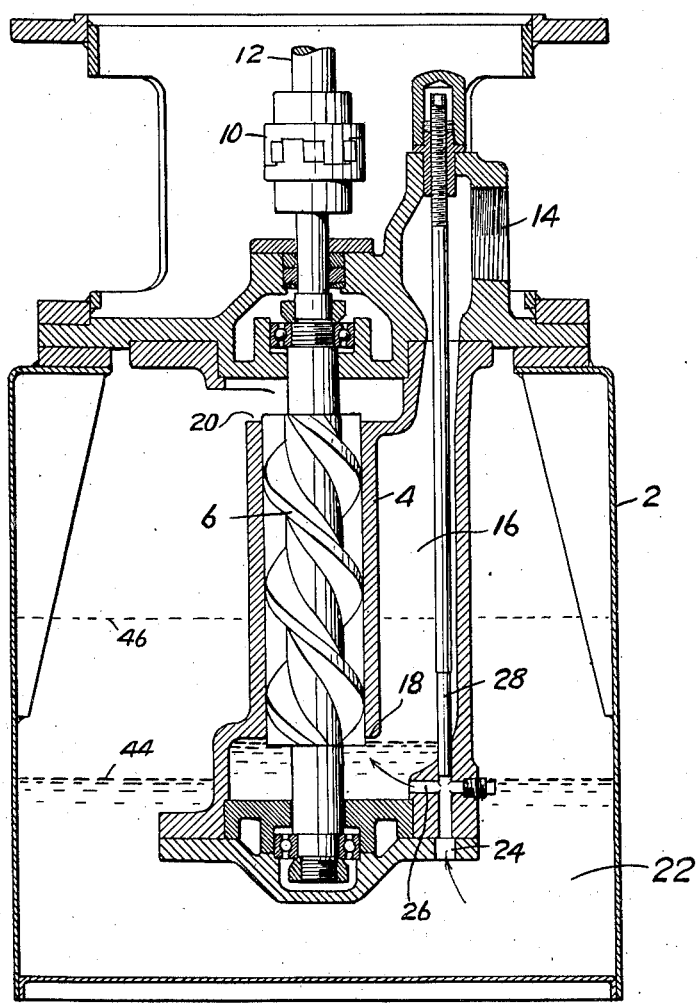

The above objects and other objects relating to details will be apparent from the following description, read in conjunction with the accompanying drawings, in which:

Figure 1 is a vertical section taken through a pumping system particularly designed for the production of high vacuum; and Figure 2 is a vertical section taken at right angles to that of Figure 1 through the central screw of a triple screw pump.

The improved pumping apparatus comprises a closed tank 2, which, as will be evident, may be designed either for the reception of air or other gas for delivery to the atmosphere if vacuum pumping is desired, or the collection of gas under compression if the screw pump is being operated as a compressor.

Within the tank 2 is a pump housing 4 arranged to contain in the present instance a single driving screw 6 and a pair of driven screws 8. The pump thus provided is preferably designed in accordance with the disclosures of the above mentioned Montelius patents, having thread arrangements on the various screws in accordance with the principles outlined in said patents to provide theoretically closed chambers arranged to travel lengthwise of the screws during their rotation. For example, as illustrated, the driving screw 6 may have two threads and each of the driven screws 8 may also have two threads. A pair of screws may be provided, rather than three screws, in accordance with the specifications set forth in Patent 1,698,802. For high speed operation, however, the triple screw arrangement is generally preferable by reason of the balanced operation which results. The screws are, furthermore, preferably designed in line with the principles of Patent 1,965,557, so that operation of the driven screws may be obtained without the use of connecting gearing between the driving screw and the driven screws.

The driving screw 8 may be driven through a flexible coupling 10 directly from a motor the shaft of which is indicated at 12. Preferably all three of the screws are mounted in ball bearings. While, when a pump of this type is used for handling a lubricating liquid such as oil, plain bearings may be provided, the small minimum amount of liquid which is desirably present in the case of the handling of elastic fluids is generally insufficient to provide adequate lubrication, and it is desirable to have the screws held in definite position in frictionless bearings. Accordingly, only enough liquid is provided to act for sealing purposes, the screws having slight clearances with each other and with the walls of the casing.

The elastic fluid being pumped is arranged to enter a passage 16 at the opening 14. The passage 16 communicates with the space below the screws through a port the upper edge of which is indicated at 18. The delivered fluid passes from the pump housing through the opening 20 into the tank 2. Within the tank 2 there is maintained a supply of sealing oil indicated at 22. This oil may flow into the lower portion of the pump chamber through passages 24 and 26, the communication between which may be controlled by a needle valve indicated at 28. If different liquids are to be employed, an adjustable needle valve is desirably provided as illustrated; however, in the event that a liquid adapted to maintain a fairly contant viscosity is to be continuously employed, it is possible to provide a fixed orifice for control of the liquid flow.

Extending downwardly from a cover plate of the tank 2 are three cylinders, 30, 32 and 34, provided with staggered openings 36, 38 and 40. The innermost cylinder communicates through pipe 42 either with the atmosphere in the case of a vacuum pump for air, or with a suitable container in the event that another gas is being evacuated from a vessel or air or some other gas is being delivered in compressed condition.

In the operation of the apparatus, the sealing liquid is maintained between a minimum level 44 and a maximum level 46, which should be substantially below the openings 36 in the outermost cylinder. Preferably, a sight gauge is provided on the tank so that the proper level of the liquid may be readily ascertained. As the pump operates, the gas which is being evacuated will be drawn inwardly through the passage 16 to be entrapped in the moving chambers formed by the screw. It is carried by them upwardly and discharged at 20 into the tank. The gas then passes through the staggered openings 36, 38 and 40, and by reason of the tortuous paths which it must follow, oil spray therein will be separated to flow downwardly along the cylinder walls into the main body of liquid submerging their lower open ends. As the operation takes place, a differential pressure will exist between passage 16 and the interior of the tank, and accordingly the liquid in the tank will flow through the passages 24 and 26 at a rate dependent upon the viscosity of the liquid and the adjustment of the needle valve 28 and will rise within the passage 16 to a position in which it will be picked up by the screw threads. By reason of the axially travelling nature of the chambers which are provided by the screws, this sealing oil will be carried upwardly along the screws.

The adjustment of the needle valve with respect to the viscosity and speed of operation and the differential pressures in the tank and passage 16 is so made that only a quite limited amount of oil is picked up by the screws for sealing purposes, the amount picked up being such as to cause no substantial reduction in the volume of the travelling chambers. The flow is adjustably so restricted as to minimize the flow of oil to prevent overheating and to avoid having the pump do a substantial amount of work in merely recirculating the sealing oil. In this way, spray is minimized and a baffling arrangement of the type illustrated in Figure 1 will be able to insure substantially complete separation of the oil and its retention within the tank. The walls of the tank act to radiate the heat generated and maintain the sealing liquid at a suitable temperature.

By the arrangement illustrated, and particularly at high speeds of operation, an extremely effective vacuum pump or compressor may be provided. The sealing liquid, being present in the form of a thin film, will prevent through its surface tension any backward escape of the elastic fluid from the travelling pump chambers, the speed of operation being such as to prevent any slow flow which might entail such escape. As a result, high vacuum may be readily produced. By reason of the high speed of operation, the capacity of a pump having quite small screws is very large.

What I claim and desire to protect by Letters Patent is:

1. An elastic fluid pump comprising a casing, members within the casing providing interengaging screw surfaces, rotating relatively to each other, having upright axes, engaging the casing, and constructed and arranged to provide during their relative rotation axially and upwardly travelling chambers closed at their ends by engagement of said screw surfaces with each other and with said casing, means for leading elastic fluid into the chambers so sealed, mean for leading elastic fluid from the pump, a supply of sealing liquid subjected to the pressure existing in said means for leading elastic fluid from the pump, a restricted orifice through which said liquid may flow from the supply under said pressure, and a chamber receiving said liquid from said orifice, located below said relatively rotating members, and in which the liquid may rise to the lower ends of said members to be picked up thereby in limited amounts to seal said upwardly travelling chambers.

2. An elastic fluid pump comprising a casing, members within the casing providing interengaging screw surfaces, rotating relatively to each other, having upright axes, engaging the casing, and constructed and arranged to provide during their relative rotation axially and upwardly travelling chambers closed at their ends by engagement of said screw surfaces with each other and with said casing, means for leading elastic fluid into the chambers so sealed including a region extending below the lowermost point of engagement of said screw surfaces and in communication therewith, means for leading elastic fluid from the pump, a supply of sealing liquid subjected to the pressure existing in said means for leading elastic fluid from the pump, and a restricted orifice through which said liquid may flow from the supply under said pressure into said region, so that the sealing liquid may rise to the lower ends of said members and the entering fluid passes over the surface of liquid in said region, the liquid thereby being picked up in limited amounts to seal said upwardly travelling chambers.

3. An elastic fluid pump comprising a casing, a plurality of interengaging screw surfaces within said casing, rotating relatively to each other, having upright axes, and constructed and arranged to provide during their relative rotation axially and upwardly travelling chambers closed at their ends, means for leading elastic fluid into said chambers including a region extending below the lowermost point of engagement of said screw surfaces and in communication therewith, means for leading elastic fluid from the pump, a supply of sealing liquid subjected to the pressure existing in said means for leading elastic fluid from the pump, and a restricted orifice through which said liquid may flow from the supply under said pressure into said region, so that the sealing liquid may rise to the lower ends of said screw surfaces and the entering elastic fluid passes over the surface of liquid in said region, the liquid thereby being picked up in limited amounts to seal said upwardly travelling chambers.

CARL OSCAR JOSEF MONTELIUS.